Sept. 7, 1948.   R. B. CONKLIN   2,448,862
CARGO-CARRYING AIRPLANE.
Filed March 13, 1944   4 Sheets-Sheet 1
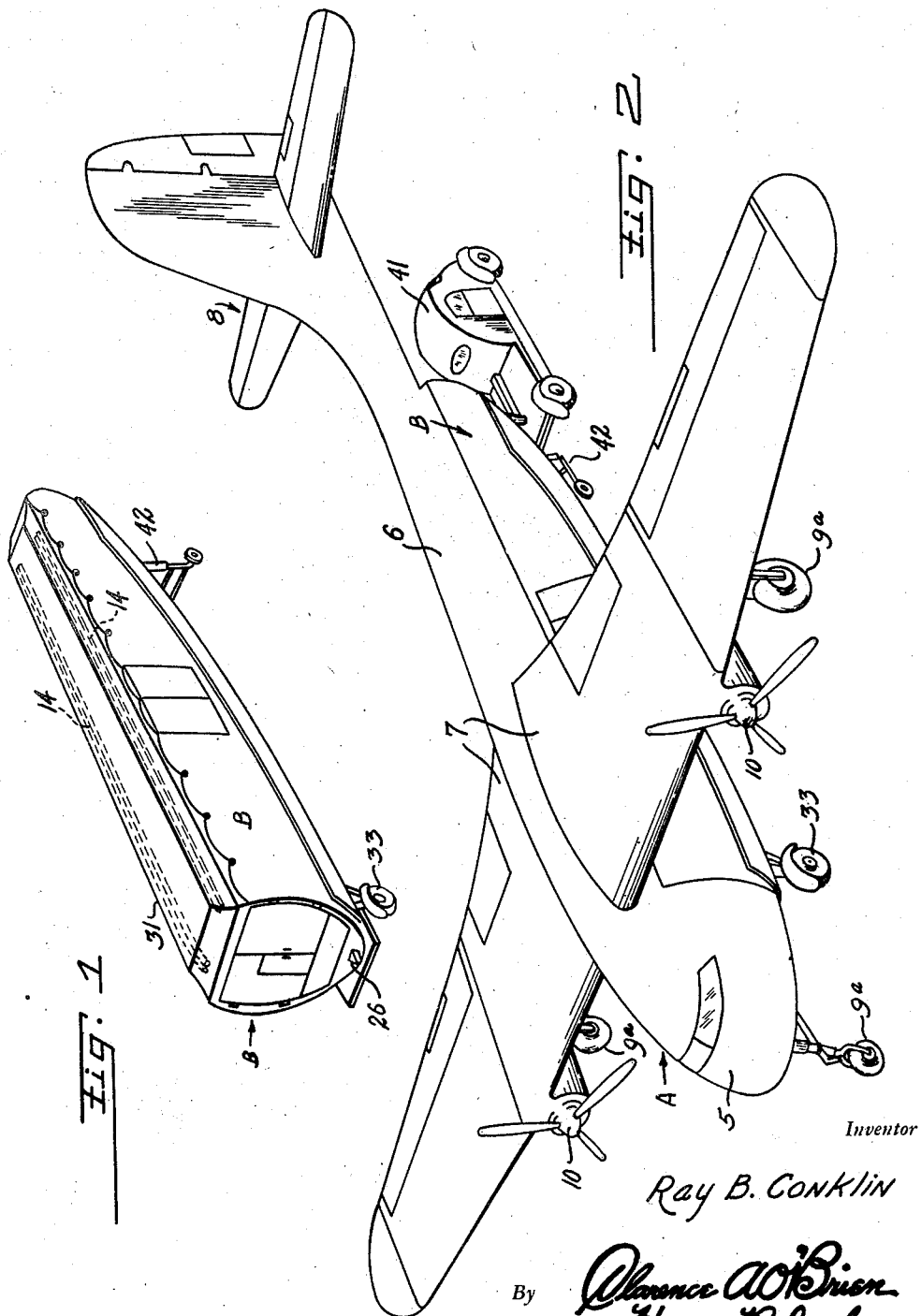
Inventor
Ray B. Conklin
By Clarence A. O'Brien
and Harvey B. Jacobson
Attorneys Sept. 7, 1948.  R. B. CONKLIN  2,448,862
CARGO-CARRYING AIRPLANE
Filed March 13, 1944  4 Sheets-Sheet 2
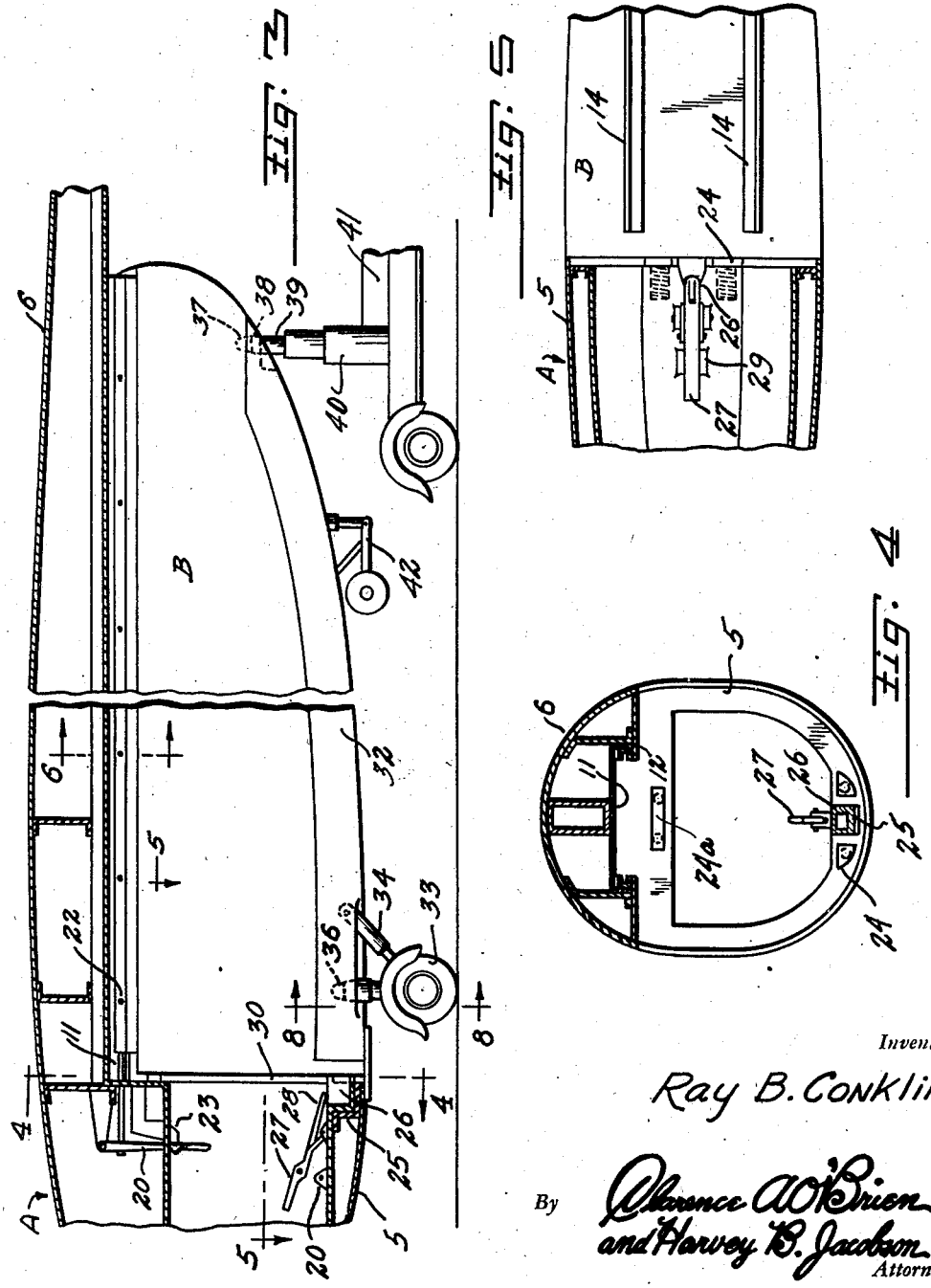
Inventor
Ray B. Conklin
By Clarence A. O'Brien
and Harvey B. Jackson
Attorneys Sept. 7, 1948.　　　　R. B. CONKLIN　　　　2,448,862
CARGO-CARRYING AIRPLANE
Filed March 13, 1944　　　　　　　　　　4 Sheets-Sheet 3
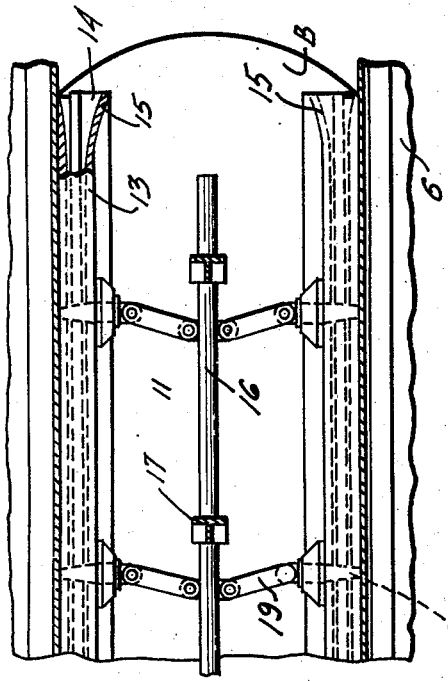
Fig. 7
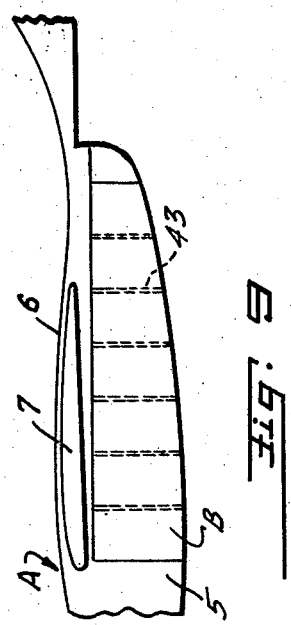
Fig. 5
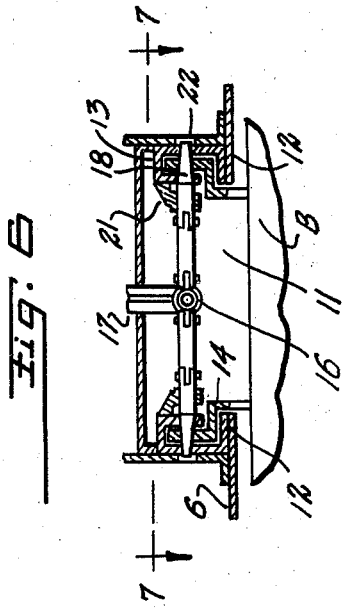
Fig. 8
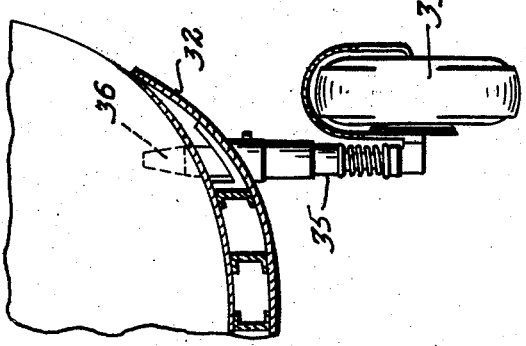
Inventor
Ray B. Conklin
By Clarence A. O'Brien
and Harvey B. Jackson
Attorneys Sept. 7, 1948. R. B. CONKLIN 2,448,862
CARGO-CARRYING AIRPLANE
Filed March 13, 1944 4 Sheets-Sheet 4
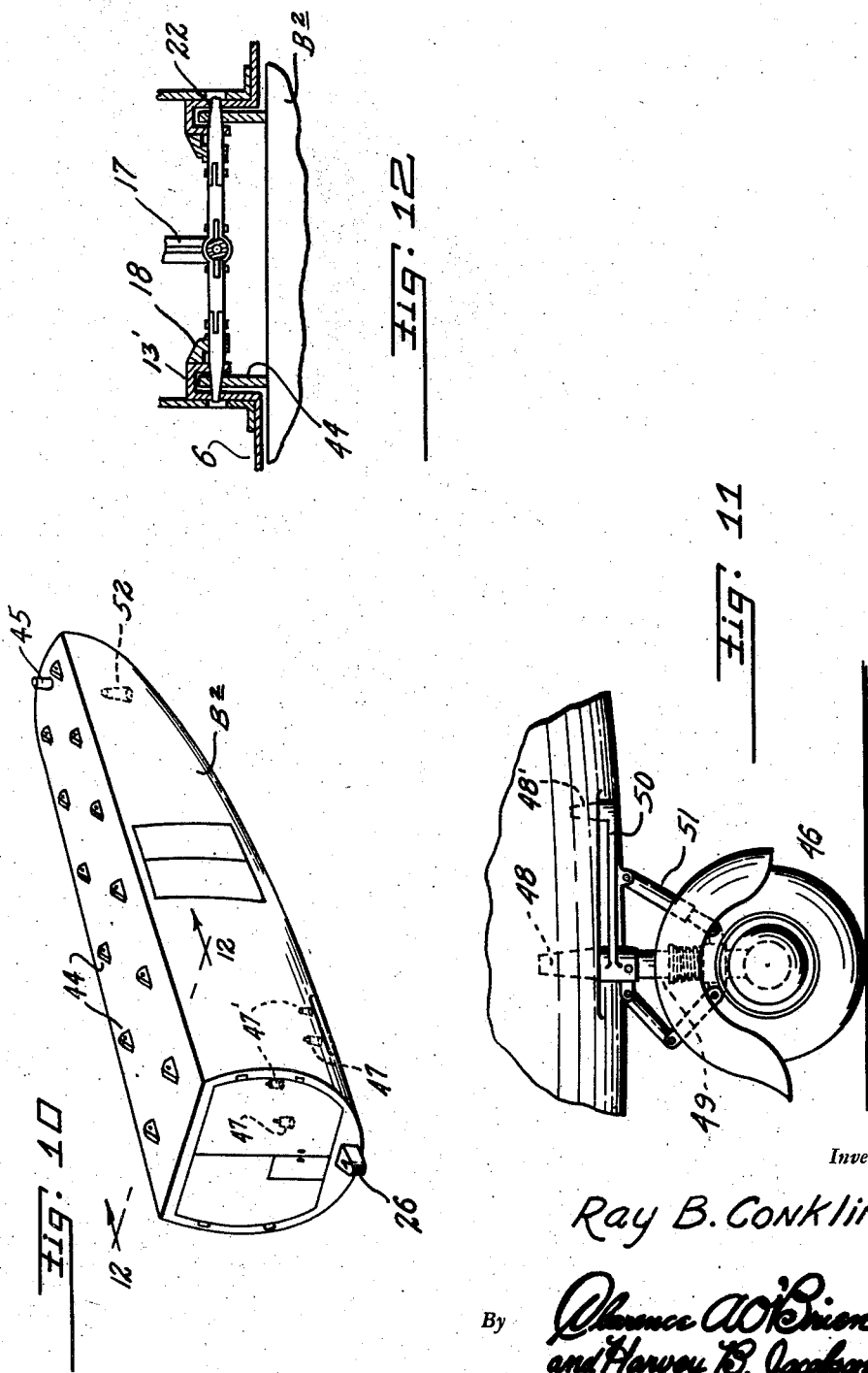
Inventor
Ray B. Conklin
By Clarence A. O'Brien
and Harvey B. Jackson
Attorneys Patented Sept. 7, 1948

2,448,862

UNITED STATES PATENT OFFICE 2,448,862

CARGO-CARRYING AIRPLANE

Ray B. Conklin, Buffalo, N. Y.

Application March 13, 1944, Serial No. 526,240

4 Claims. (Cl. 244—118)

This invention relates to cargo-carrying airplanes of that type which embodies a detachable cargo-carrying section that may be removed and transported over the ground from the airport to a distant point of delivery for the cargo, or that may be loaded at such distant point and transported over the ground to the airport for attachment to the main section of the airplane so that the cargo may be flown to a distant airport for delivery.

The principal advantage of a cargo-carrying airplane of the above kind is that it eliminates the necessity of loading or unloading the cargo at the airport and permits all loading or unloading to be done at the points of cargo supply or delivery remote from the airport. Thus, upon detachment of a cargo-carrying section from the main section of a cargo-carrying airplane at the airport, another cargo-carrying section may be immediately substituted therefor, thereby expediting cargo delivery with a minimum amount of equipment.

An important object of the present invention is to provide a cargo-carrying airplane of the above kind in which the main airplane section or unit is provided with all of the mechanism and instrumentalities necessary for flight, whereby said main airplane section may be flown from one airport to another without a cargo section whenever the same may be found necessary or desirable, and whereby disconnection and connection of mechanisms and instrumentalities necessary to flight is not required upon detachment or attachment of the cargo-carrying section with respect to the main section of the airplane.

A further important object of the present invention is to provide the cargo-carrying section with demountable or removable wheeled supporting means or running gear for use in transporting the cargo-carrying section over the ground, whereby said wheeled supporting means or running gear may be removed to enable the cargo-carrying section to carry a maximum load when attached to the main airplane section and flown to a distant airport.

Another important object of the present invention is to provide improved means for effecting detachable connection of the cargo-carrying section to the main section of the airplane.

Still another object of the present invention is to provide means for releasably locking the cargo-carrying section in place when attached to the main section of the airplane, which means is manually operable from a point within the main airplane section in an easy and expeditious manner.

Still another object of the present invention is to provide an airplane including a main section characterized as specified above, and a removable temporary section that may be applied in lieu of a cargo-carrying section to provide the main section with a continuous streamlined fairing and enable it to be flown without a cargo section.

Other objects and features of the present invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a perspective view of one form of cargo-carrying airplane section constructed in accordance with the present invention, together with a cover for the top of the said section and a demountable or removable wheeled carriage or running gear for use in towing the cargo-carrying section over the ground.

Figure 2 is a perspective view of a complete cargo-carrying airplane constructed in accordance with the present invention and including the cargo-carrying section and carriage or running gear of Figure 1, a tractor or towing unit being shown in position for removing the cargo-carrying unit and towing the same over the ground.

Figure 3 is an enlarged fragmentary view of the construction as shown in Figure 2, the illustrated portion of the main airplane section being in substantially central longitudinal section, and the cargo-carrying section being in side elevation.

Figure 4 is a vertical transverse section taken on line 4—4 of Figure 3.

Figure 5 is a fragmentary horizontal section taken on line 5—5 of Figure 3.

Figure 6 is an enlarged transverse fragmentary section taken on the plane of line 6—6 of Figure 3.

Figure 7 is a horizontal fragmentary section taken on the plane of line 7—7 of Figure 6.

Figure 8 is a fragmentary vertical transverse section, drawn on an enlarged scale and taken substantially on line 8—8 of Figure 3.

Figure 9 is a fragmentary side elevational view showing the same airplane section equipped with a temporary fuselage section in lieu of the cargo-carrying section.

Figure 10 is a perspective view of a modified form of the cargo-carrying section constructed in accordance with the present invention.

Figure 11 is a fragmentary side elevational view showing a demountable wheel unit for the cargo-carrying section that may be employed in lieu of the wheeled carriage or running gear of Figures 1 to 3, inclusive, and Figure 8.

Figure 12 is a view somewhat similar to Figure 6, showing the manner in which the cargo-carrying section of Figure 10 is engaged with and locked to the main airplane section.

Referring in detail to the drawings, the present cargo-carrying airplane is illustrated as including a main section A and a detachable cargo-carrying section B. The main section A includes a fuselage section having a forward portion 5 and an integral upper rear portion 6, the fuselage section of the main airplane section carrying lateral wing sections or airfoils 7, and the motive power and control devices of the airplane. The upper rear portion of the fuselage section of the main airplane section is provided at its rear end with an empennage or tail structure 8 that preferably projects rearwardly of the cargo-carrying section B and is located entirely above the latter. Also, the main airplane section is provided with suitable landing gear that may include a ground-engaging wheel 9a on the fuselage portion 5 and ground-engaging wheels 9a on the wings or airfoils 7. The wings or airfoils 7 may embody motor-propeller units 10, and the cargo-carrying section B may extend forwardly under the wings 7 as shown. It will be seen that the forward and upper rear fuselage portions 5 and 6 of the main airplane section have a fixed streamlined fairing, that the cargo-carrying section B constitutes a rear lower fuselage section of the airplane and has a fixed streamlined fairing, and that the adjacent walls of said fairings form therebetween one continuous fairing when the airplane sections are connected.

In the embodiment of Figures 1 to 8, inclusive, the upper rear fuselage portion 6 has a relatively wide longitudinal recess in the under side thereof, as indicated at 11 and shown more clearly in Figures 3 and 4. The recess 11 extends rearwardly from the fuselage portion 5 and is open at the rear at a point forwardly of the empennage 8, and inwardly projecting horizontal ledges 12 are provided along opposite sides of the recess 11 at the bottom of the latter. Positioned and secured upon the ledges 12 are guide rails 13 that are of substantially C shape in cross section and are open along the lower inner sides thereof. Fixed to the top of the cargo-carrying section B are a pair of spaced longitudinal slide rails 14 which are of angular form and adapted for longitudinal sliding reception within the guide rails 13 when horizontally aligned with the latter. To facilitate guiding of the slide rails 14 into the guide rails 13, the rear ends of the latter are preferably inwardly flared, as at 15 (see Fig. 7).

Means is provided for releasably holding the cargo section B in assembled relation to the main airplane section A, which means is manually operable from within the fuselage portion 5 of the main airplane section. As shown, this means preferably consists of a horizontal operating rod 16 disposed longitudinally of the recess 11 intermediate the guide rails 13 and supported for longitudinal sliding movement in hangers 17, said operating rod 16 being operatively connected at intervals to locking bolts 18 by means of toggle links 19, and having an operating lever 20 connected to the forward end thereof within the fuselage portion 5 as shown in Figure 3. The bolts 18 are slidably mounted in guide brackets 21 fixed to the guide rails 13, and are adapted to enter openings provided at 22 in the rails 13 and 14, which openings are aligned when the cargo-carrying section B is operatively assembled to the main airplane section. Obviously, by sliding the rod 16 in one direction, the bolts 18 may be released to permit removal of the cargo-carrying section, and by moving the rod 16 in the opposite direction, said bolts 18 may be projected for locking the cargo section B in place. As shown in Figure 3, a bracket 23 may be provided to which the lever 20 may be locked and sealed when the bolts 18 are moved to locking or securing position by said lever 20.

To absorb the shock of assembling the cargo-carrying section to the main section of the airplane, suitable shock absorbers 24 and 24a may be provided respectively on the rear lower portion and the rear upper portion of the fuselage portion 5 in position to be abutted by the forward end portion of the cargo-carrying section B. As shown in Figure 4, these bumpers are preferably disposed in spaced relation at opposite sides of a recess 25 provided in the fuselage portion 5 and adapted for reception of a centering lug 26 of tapering form provided on the forward lower end portion of section B. A tightening lever 27 may be provided in the fuselage portion 5 that is detachably engageable with the centering lug 26, as at 28, for tightly drawing the lower front portion of the cargo-carrying section B into engagement with the fuselage portion 5. A bracket 29 may also be provided to facilitate locking of lever 27 and sealing it in its securing position. Also, a yieldable sealing strip is preferably provided at the rear of the fuselage portion 5 to seal the joint between the latter and the cargo-carrying section B when the latter is secured in place. As shown in Figure 1, a suitable canvas or like removable cover 31 may be provided for the top of the cargo-carrying section B and the slide rails 14 thereof, when said cargo-carrying section is parked and not in use.

Wheeled supporting means of a demountable or detachable kind is provided for supporting the cargo-carrying section B, so that the latter is adapted for land travel when towing the same to and from the airport. As shown in Figures 1 to 3, inclusive, and Figure 8, this supporting means may consist of a carriage including an elongated cradle 32 shaped to fit and snugly receive the bottom portion of the cargo-carrying section B, and provided at opposite sides of its forward end portion with ground-engaging supporting wheels 33, each having a mounting including a shock absorber 34 and a jack having a vertically movable member 35 and provided with a tapered post 36 that projects above the cradle 32 and is snugly received in a socket provided in the bottom of the cargo-carrying section B. The cargo-carrying section B is also provided near its rear end with a bottom socket at 37 aligned with an aperture provided in the cradle 32 at 38 and adapted for reception of the tapered end of a post 39 provided on the vertically movable member of a jack 40 mounted on the rear of a mobile tractor or towing unit 41 of a type commonly employed in motor vehicles of the tractor-trailer variety. The carriage 32 is preferably provided near its rear end with a foldable wheeled propping device 42 for supporting the rear end of the cargo-carrying unit B in a proper elevated position when said cargo-carrying section is parked, or when it is detached from the main airplane section and not supported by the towing unit 41.

As shown in Figure 9, a collapsible temporary fuselage section B' is provided for use in lieu of the cargo-carrying section B whenever it is desired to adapt the main airplane section for practical flight without a cargo-carrying section. This collapsible temporary fuselage section B' may consist of an envelope or covering of flexible limber material so that it may be collapsed or extended longitudinally, suitable transverse distending members or ribs 43 being provided in the envelope at spaced intervals so that it will have the proper cross sectional contour when extended. The section B' may be suitably secured in place and faired into the overhead supporting portion 6 of the fuselage section for the main airplane section. When the fuselage section B' is applied, the walls thereof and the walls of the fuselage portions 5 and 6 form therebetween substantially one continuous fairing. Thus, with the fuselage section B' attached, the fuselage section of the main airplane section has its streamline form completed thereby so as to provide for proper air flow in flight.

A modified means of locking the cargo-carrying section to the overhead fuselage portion 6 is illustrated in Figures 10 and 12. In this form, the cargo-carrying section B² has spaced rows of upstanding ears 44 fixed to the top thereof, in lieu of the slide rails 14, and inverted channel-shaped guide rails 13' are substituted for the substantially C-shaped guide rails 13. The apertures of ears 44 are adapted to align with apertures provided at 22' in rails 13' for reception of the locking bolts 18 of operating rod 16, as previously described with respect to the construction shown in Figures 1 to 7, inclusive. The essential difference here is that the cargo-carrying section B may be positioned under the fuselage portion 6 and raised into position for being locked into place, instead of being slid longitudinally into place, as with the embodiment of Figures 1 to 7, inclusive. Otherwise, the construction of both forms is similar, and remaining like parts are indicated by corresponding reference characters. This does not include an additional feature consisting of a tapered post 45 provided on the top of the cargo-carrying section B² at the rear end of the latter, which post is adapted to be received in a socket provided in the rear portion of the overhead fuselage portion 6. This post and socket arrangement is provided merely to aid in centering the sections when assembling the cargo-carrying section to the main airplane section. Also, in this embodiment, the cargo-carrying section B² may be provided with demountable or detachable wheel units including ground-engaging supporting wheels 46. The purpose here is to apply the wheel units directly to the cargo-carrying section instead of providing them on a cradle, as in Figure 3. For this purpose, the cargo-carrying section B' is provided near opposite sides of its forward end with bottom sockets, as at 47, and 47', and each pair of sockets 47 and 47' is adapted for reception of the posts 48 and 48' of a wheel unit. Each wheel unit includes a jack which has a vertically movable member 49 and carries the post 48 that has an arm 50 fixed thereto which carries the post 48'. The wheel unit also includes a shock absorbing element 51 to absorb road shocks. The jacks of the wheel units are used in conjunction with the jack of the towing unit to elevate the cargo-carrying section B² into position for being attached to the main airplane section and for lowering it for being towed away. In this embodiment, it is necessary to construct the cargo-carrying section B² so that it will withstand road strains, whereas this is not necessary in the embodiment employing the cradle 32. The cargo-carrying section B² will have a socket 52 at its rear end for reception of the post 38 of the towing unit 41, as indicated by dotted lines in Figure 10.

In using the construction of Figures 1 to 8, inclusive, the cargo-carrying section B is backed into approximate position by the towing unit 41, after which said cargo-carrying unit B is raised to a proper level by means of the jacks of the wheel units and the towing unit 41. In this position, the slide rails 14 will be disposed to enter the guide rails 13 without resting on the latter, and the cargo-carrying section is then backed into the main airplane section. The centering lug 26 is then entered and tightening lever 27 is operated, whereupon the cargo section is allowed to lower until the rails 14 rest on the rails 13. Locking lever 20 is then operated to lock the cargo-carrying unit in place. Removal of the cargo section is effected by a reversal of this operation. As the operation of the embodiment of Figures 10 to 12, inclusive, has been previously explained, it is believed that the construction and operation, as well as the advantages of the present invention, will be readily understood and appreciated by those skilled in the art. Minor changes in details of construction illustrated and described are contemplated, such as fairly fall within the spirit and scope of the invention as claimed.

What I claim as new is:

1. A cargo-carrying airplane including a main airplane section having lateral wing sections and a cargo-carrying section slidably interengaged for longitudinal connection and disconnection to and from each other, said main airplane section including a fuselage section having a forward cockpit portion and a rear upper portion provided with a tail structure, the main airplane section carrying the motive power devices and controlling devices necessary to flight, and said cargo-carrying section comprising a rear lower fuselage section of a form to complete the fuselage structure of the airplane when applied to the main airplane section, the front end of said cargo-carrying section abutting the rear of the forward fuselage portion of said main airplane section, releasable means for locking the top of the cargo-carrying section to the rear upper fuselage portion of the main airplane section, said locking means including a longitudinally slidably operating rod mounted longitudinally of said rear upper fuselage portion and extending into said forward cockpit portion, and actuating means for said operating rod located in the forward cockpit portion of said main airplane section.

2. A cargo-carrying airplane including a main airplane section and a cargo-carrying section completely detachable from said main airplane section, said main airplane section including a fuselage section having a forward cockpit portion and a rear upper portion provided with a tail structure, the main airplane section carrying the motive power devices and controlling devices necessary to flight, and said cargo-carrying section comprising a rear lower fuselage section of a form to complete the fuselage structure of the airplane when applied to the main airplane section, the front end of said cargo-carrying section abutting the rear of the forward fuselage portion of said main airplane section, centering means for the cargo-carrying section including cooperating elements on the forward end of said cargo-carrying section and the rear of said forward fuselage portion, and a suitably operable tightening lever mounted in said forward fuselage portion and engageable with the centering element of the cargo-carrying section to effect a tight joint between the airplane sections.

3. A cargo-carrying airplane including a main airplane section and a cargo-carrying section completely detachable from said main airplane section, said main airplane section including a fuselage section having a forward portion and a rear upper portion provided with a tail structure, the main airplane section carrying the motive power devices and controlling devices necessary to flight, and said cargo-carrying section comprising a rear lower fuselage section of a form to complete the fuselage structure of the airplane when applied to the main airplane section, centering means for the cargo-carrying section including cooperating elements on the forward end of said cargo-carrying section and the rear of said forward fuselage portion, and a suitably operable tightening lever mounted in said forward fuselage portion and engageable with the centering element of the cargo-carrying section to effect a tight joint between the airplane sections, and means for sealing the joint between said forward fuselage portion and the forward end of said cargo-carrying section.

4. A cargo-carrying airplane including a main airplane section and a cargo-carrying section completely detachable from said main airplane section, said main airplane section including a fuselage section having a forward portion and a rear upper portion provided with a tail structure, the main airplane section carrying the motive power devices and the controlling devices necessary to flight, and said cargo-carrying section comprising a rear lower fuselage section of a form to complete the fuselage structure of the airplane when applied to the main airplane section, said rear upper fuselage portion having longitudinal spaced guide rails fixed to the under side thereof, said cargo-carrying section having spaced longitudinal slide rails fixed to the top thereof for longitudinal sliding movement into or out of said guide rails, and releasable means for locking the top of the cargo-carrying section to the rear upper fuselage portion of the main airplane section, said locking means including bolts supported by the rear upper fuselage section and movable laterally into engagement with said slide rails and said guide rails.

RAY B. CONKLIN.

REFERENCES CITED

The following references are of record in the file of this patent:

UNITED STATES PATENTS

| Number | Name | Date |
|---|---|---|
| 1,237,834 | Stamper | Aug. 21, 1917 |
| 1,383,381 | Borst | July 5, 1921 |
| 1,797,713 | Brogelli | Mar. 24, 1931 |
| 1,949,304 | Hardin | Feb. 27, 1934 |
| 1,992,941 | Fowler | Mar. 5, 1935 |
| 2,075,042 | Knerr | Mar. 30, 1937 |
| 2,099,684 | Fitch | Nov. 23, 1937 |
| 2,123,505 | Faries | July 12, 1938 |
| 2,165,641 | Mattox | July 11, 1939 |
| 2,215,003 | Johnson | Sept. 17, 1940 |
| 2,294,003 | Scheufele | Aug. 25, 1942 |
| 2,352,323 | Hooker | June 27, 1944 |
| 2,376,478 | Dellbringge | May 22, 1945 |
| 2,387,527 | Nagamatsu | Oct. 23, 1945 |